Aug. 17, 1965   W. H. BRIXEY   3,201,755
TELEMETERING SYSTEM FOR USE WITH TELEGRAPH TRANSMISSION
Filed Jan. 8, 1960   3 Sheets-Sheet 1

INVENTOR.
WILLIAM H. BRIXEY
BY
*Paul H. Johnson*
ATTORNEY

Aug. 17, 1965     W. H. BRIXEY     3,201,755
TELEMETERING SYSTEM FOR USE WITH TELEGRAPH TRANSMISSION
Filed Jan. 8, 1960     3 Sheets-Sheet 3

*INVENTOR.*
WILLIAM H. BRIXEY
*BY*
Paul H. Johnson
ATTORNEY

United States Patent Office 3,201,755
Patented Aug. 17, 1965

3,201,755
TELEMETERING SYSTEM FOR USE WITH
TELEGRAPH TRANSMISSION
William H. Brixey, 405 S. Zurich, Tulsa, Okla.
Filed Jan. 8, 1960, Ser. No. 1,331
1 Claim. (Cl. 340—151)

This invention relates to a telemetering system for use with a telegraph network. More particularly, the invention may be described as a method of automatically transmitting meter readings and other digital information by use of the telegraph process.

In industry a requirement frequently exists wherein it is advantageous to have readily available information such as meter reading, where the meters are positioned at remote points. This is particularly true in the oil industry and especially with pipeline companies. In transporting petroleum products across large distances by use of pipelines, and particularly where a complete system of pipelines transmitting a variety of petroleum products is functioning as a network, it is desirable, and in fact, mandatory in many cases, that the control of the pipeline system be managed from one central point. Only through centralized control can maximum utilization and efficiency be affected to make use of the tremendous investments required to build pipeline networks.

In order to provide a centralized control point, pipeline companies are faced with the problem of rapidly securing information such as the level of liquid in tanks situated at a variety of positions along the pipelines. In addition to requiring information as to the volume of liquids in particular tanks, other information is required such as the rate of flow of products, the pressure on lines, the type of material being transmitted, the position of valves—whether opened or closed, and all other information relative to the transmission of the petroleum products through the pipelines.

In order to constantly provide this information at a centralized control point, a great deal of expense has been encountered. Some companies have installed telephone communications to all points, but this requires an operator to be on location to read gauges and meters, and be available to report the readings back to the centralized point when called upon. The requirement of an operator is an increased expense. Also, the relaying of information verbally leads to costly mistakes.

This invention discloses a novel process of utilizing telegraph transmission and receiving mechanisms to automatically relay required information without the necessity of an operator being at the location of the instruments to be read. Many installations in pipeline networks are equipped with telegraph circuits. This invention is disposed to utilize the existing telegraph circuits and existing teletypewriter sending and receiving equipment in a novel manner to convert tank gauge readings, meter readings and so forth into standard telegraph signals.

The present invention contemplates a novel telegraphic metering system. Broadly stated the invention may be defined as an energizing circuit; a step switch actuator mechanism disposed to be placed in operation by said energizing circuit; a step switch mechanism actuated by said step switch actuator mechanism; value indicating switches positioned in series with said step switch mechanism; a bit card device positioned in series with said step swtch and said value indicating switches; distributor relays actuated by said bit card device to close contacts whereby a telegraphic signal is applied to a teletypewriter transmission line and whereby the telegraphic signal when printed out at the teletypewriter receiver provides a written record of the values indicated by the value indicating switches.

An object of this invention is to provide a method of converting digital information into telegraphic signals.

Another object of this invention is to provide a mechanism for automatically actuating a step switch whereby various digital figures, letters and functions may be transformed into a telegraphic code.

Another object of this invention is to provide a sensitizing circuit where actuation of a telegraph sending station in a particular sequence automatically actuates a repeating mechanism to return data to the sending station.

Another object of this invention is to provide a mechanism wherein the standard characters of a telegraph transmitting installation may be used to actuate an automatic meter reporting station.

Another object of this invention is to provide a step switch actuating mechanism which will move the stepping switch in sequence to actuate a predetermined number of telegraphic characters and to automatically return the stepping switch to home position.

Another object of this invention is to provide a method of converting digital information into a telegraphic code.

Another object of this invention is to provide a bit card device wherein a single voltage signal sets up a telegraph code whereby each character in the teletypewriter system is reproducible by the teletypewriter receiver.

Another object of this invention is to provide a mechanism for setting up a telegraphic code and automatically transmitting the code to a telegraph receiving station.

Another object of this invention is to provide a bit card device whereby a multiunit telegraphic code may be set up by the closure of a circuit.

These and other objects and a better understanding of the invention may be had by referring to the following description and claims, taken in conjunction with the attached drawings, in which:

Before referring directly to the drawings, the circumstance under which the invention will be used should first be understood. It will be assumed that the user of the invention is a pipeline company which has its main offices and control point in the city of Tulsa, Oklahoma. Second, it will be assumed that the pipeline company has a pump station on one of its pipelines located near Fort Smith, Arkansas. The pipeline on which the pump station at Fort Smith is located is one line in a network of pipelines operated by the company which transmits a variety of fluids, particularly petroleum products, at different volumes, speeds and pressures to a variety of points over a wide geographical area. It can be seen that it is highly important that the main control point at Tulsa, Oklahoma, have constantly available information concerning physical conditions of the pump station at Fort Smith, Arkansas. It will be further assumed that a teletypewriter machine exists at the Fort Smith pumping station communicating by the usual telegraph line with a teletypewriter positioned at the main control point at Tulsa, Oklahoma. An important object of this invention is to provide a means whereby the operator at Tulsa, Oklahoma, can use the telegraph system to signal the teletypewriter machine at the Fort Smith pump station whereby the teletypewrier machine at the Fort Smith station will automatically return information concerning physical conditions at the station back to the operator at Tulsa.

The teletypewriter at the central control point of Tulsa is not altered in any way nor is there any equipment which must be attached to it to achieve the results of this invention. If the teletypewriter at Tulsa and Fort Smith are part of a network, the application of the system of this invention to the teletypewriter at Fort Smith will not interfere with normal functioning of the telegraph network.

Figure 1:
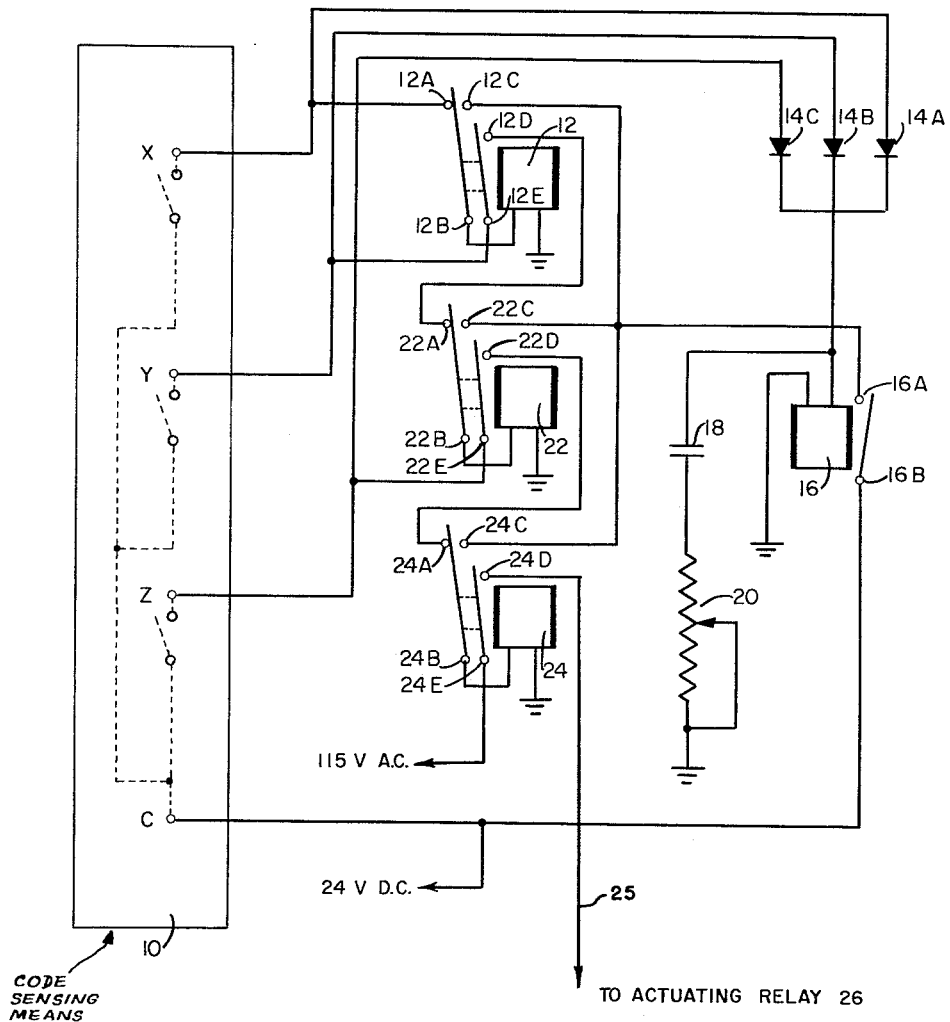
FIGURE 1 is a schematic diagram of a system of energizing an actuating relay upon sequential closing of selected characters of a teletypewriting receiver.

Referring first to FIGURE 1, the means whereby the teletypewriter machine positioned at the Fort Smith pump station can be automatically sensitized to return data to the central control point is shown diagrammatically. The numeral 10 indicates the function box of the teletypewriter device. The function box or stunt box, as it is sometimes called, is a standard component of teletypewriter equipment available from the Teletype Corporation. A function box 10 in essence is a device whereby character contacts are closed as each character or key is depressed during the receiving operation. Only those contacts are shown associated with the characters X, Y, and Z. The selecting means of this invention utilizes these three character contact points as a means of sensitizing the automatic devices of the invention to return data from the pump station. Three characters are selected to be used to actuate the device. Although any three characters may be selected, the letters X, Y, and Z have been chosen. The reason for selecting the combination X, Y, and Z is that these three letters very infrequently appear in this order in usual telegraphic communication. When the operator in the Tulsa control point requires information from the Fort Smith pump station, he merely types into his teletypewriter machine the letters X, Y, and Z in rapid sequence. At the Fort Smith pump station the teletypewriter receives the letters X, Y, and Z, which closes character contacts associated with these three letters in the function box, automatically setting up a method of returning information to the Tulsa operator by means of the selected circuit shown in FIGURE 1.

When the operator at Tulsa depresses the letter X on his teletypewriter machine, a coded telegraph signal will be sent out which will close the character contact in the function box of the teletypewriter receiving device at the Fort Smith pump station associated with the letter X for approximately one hundred and sixty-three milliseconds competing a twenty-four volt source through common terminal C. The twenty-four volt source is then placed on contact 12A of first character relay 12, which is a normally closed contact, and the voltage will be impressed from 12A to contact point 12B and to the coil of relay 12. This will energize relay 12. At the same time that a voltage is placed on contact 12A, a voltage is placed through a unidirectional current device, such as a diode, 14A to delay relay 16, energizing it to its closed position. When delay relay 16 closes, contact is made between contact points 16A and 16B placing voltage at contact 12C of relay 12.

When relay 12 is closing, contact will be made between points 12B and 12C before contact is broken between 12A and 12B. This is commonly referred to as a make-before-break type relay contact. Since voltage will be impressed on contact 12C when relay 12 actuates, relay 12 will remain under a voltage potential and will remain closed. When relay 12 is closed, contact is made between auxiliary contacts 12E and 12D also, for a purpose which will be described later.

A time delay means is placed in parallel with delay relay 16 consisting of a capacitor 18 in series with a potentiometer 20 connected so that the total resistance in series with the capacitor 18 may be varied. When the character contact of the function box 10 is closed, as stated previously, a voltage of a duration of approximately one hundred and sixty-three milliseconds will be placed across delay relay 16. This voltage charges capacitor 18 in addition to closing delay relay 16. When the one hundred and sixty-three milliseconds has elapsed the voltage will no longer be impressed through diode 14A and capacitor 18 will begin to discharge. During its time of discharge it will cause current to flow through the delay relay 16 and will keep it closed. This causes a time delay after the voltage supplied by contact X has been removed. The amount of delay which will be caused can be adjusted by varying the resistance of potentiometer 20. The smaller the resistance of potentiometer 20, the faster the current will flow from the completed circuit through the capacitor 18 and potentiometer 20 in series with delay relay 16 and the quicker the voltage across delay relay 16 will drop to the point where delay relay 16 will open, breaking contact between 16A and 16B. For the purposes of this disclosure it will be assumed that the time delay circuit of capacitor 18 and potentiometer 20 is adjusted so that delay relay 16 will remain closed for approximately thirty-seven milliseconds after the voltage from contact point X of function box 10 has been removed. Thus delay relay 16 associated with the teletypewriter at Fort Smith, will remain closed for a total of approximately two hundred milliseconds when the operator in Tulsa depresses key X on his teletypewriter machine.

During this two hundred milliseconds, relay 12 is closed and contact is maintained between auxiliary contacts 12E and 12D. If, within two hundred milliseconds after striking key X the operator in Tulsa strikes key Y, the contact associated with character Y will close at Fort Smith, inducing twenty-four volts for one hundred and sixty-three milliseconds through auxiliary contacts 12E and 12D to contact point 22A and 22B and thus to the second character relay 22. This will serve to close relay 22. As relay 22 closes contact is made between 22B and 22C before contact is broken with 22A. Delay relay 16 will close by current flowing through diode 14B so that a voltage will be applied through contact 22C and 22B and to the relay 22, keeping it closed after it has actuated. It will be observed that relay 22 will not close when contact Y of function box 10 is closed unless a path exists between auxiliary contacts 12E and 12D. This means that if key Y is not depressed within two hundred milliseconds after key X is depressed, relay 22 will not close. However, if key Y is depressed by the operator in Tulsa within two hundred milliseconds after depressing key X, then both relays 12 and 22 at the pump station in Fort Smith will close. In an analagous manner as described for the letter X, current flowing through unidirectional current device 14B closes delay relay 16 and will keep relay 22 closed for a period of approximately two hundred milliseconds due to the time delay imposed by capacitor 18 and potentiometer 20.

Figure 2:
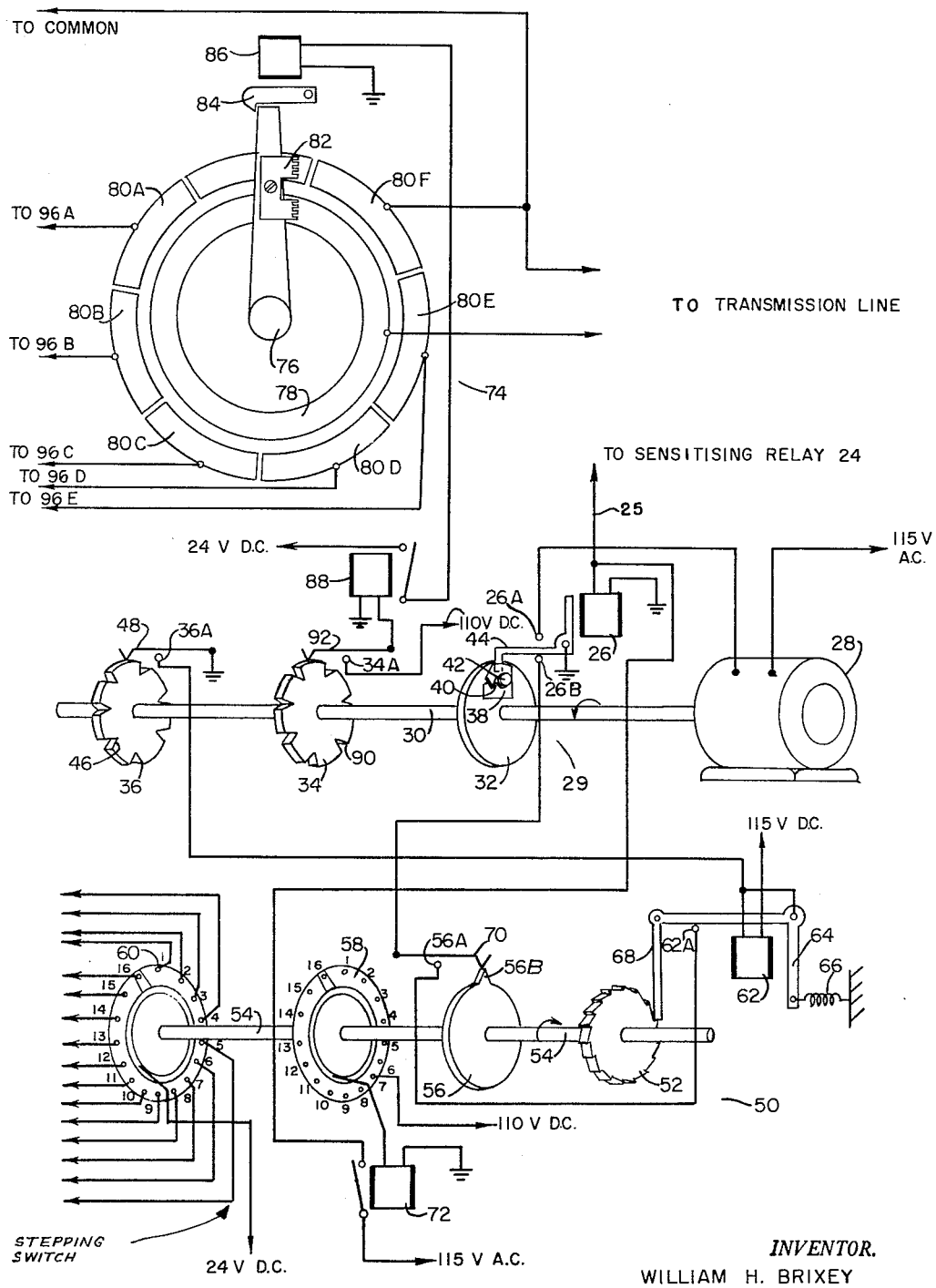
FIGURE 2 is a schematic diagram of a stepping switch actuating mechanism, a stepping switch mechanism and a telegraph distributor whereby a teletypewriter code is placed on telegraph transmission loop.

If the operator in Tulsa then strikes key Z within two hundred milliseconds after striking key Y, a voltage will be impressed from character contact Z on the function box 10 through auxiliary contacts 22E, 22D, to relay point 24A, 24B, to close the third character relay 24. When relay 24 closes a voltage source applied to contact point 24E is impressed on contact point 24D which closes and by way of conductor 25 actuates relay 26. (FIGURE 2). When actuating relay 26 closes, mechanisms of the invention are put into operation to automatically transmit through the teletypewriter machine at the Fort Smith pump station back to the control station at Tulsa the required information. Current flowing through unidirectional current device 14C will serve to keep delay relay 24 closed for two hundred milliseconds to make certain actuating relay 26 has time to close.

The system of energizing an actuating relay upon the sequential closing of selected characters of a teletype receiving device of FIGURE 1 is so designed that the normal typing of letters X, Y, and Z would never serve to close actuating relay 26. In order to close actuating relay 26 the letters X, Y, and Z must be closed in rapid sequence not exceeding two hundred milliseconds apart.

This exceeds the normal speed of manual typing and thus, even if the letters X, Y, and Z should occur in sequence in normal message typing, the system of energizing an actuating relay of FIGURE 1 would not be actuated to close actuating relay 16. The invention of this disclosure is adaptable to the teletypewriter devices in current use without modifying or anyway interfering with the normal use of the existing teletypewriter equipment or telegraph transmission networks.

This description has been made incorporating the use of three character relays 12, 22 and 24 in association with three teletypewriter characters X, Y, and Z. It can be seen that the principles of this invention can be applied to the use of only two characters, for instance X and Z, eliminating character Y and relay 22. Also, it can be seen that additional relays may be inserted with circuit arrangements similar to relay 22, corresponding with different teletypewriter characters so that four, five, six or any number of characters must be actuated in proper sequence to energize actuating relay 26.

Referring now to FIGURE 2, the means of this invention whereby a stepping switch device is systematically advanced to set up teletypewriter codes of meter readings is shown diagrammatically.

The numeral 28 indicates the motor of a multiple cam timer of a type similar to model RC-D of the Industrial Timer Corporation of Newark, New Jersey. The multiple cam timer is indicated generally by the numeral 29. Motor 28 has affixed to it a shaft 30 which drives cams 32, 34 and 36. Cam 32 is a circular plate with a notch (not shown) at one point on its circumference. Coincident with the notch is a pawl plate 38. The pawl plate 38 is a flat plate contoured to the periphery of the cam 32 and is pressed against the side or face of the cam 32 by a spring 40 and a stud 42. A cam lever 44 is disposed to slide upon the periphery of cam 32. When cam lever 44 engages pawl plate 38 it pushes pawl plate 38 aside, compressing spring 40, and the cam lever 44 falls into a notch in the periphery of cam 30. (The notch is not shown in that it is hidden by pawl plate 38.)

When cam lever 44 is actuated and is moved out of the notch of cam 32 the pawl plate 38 immediately closes and holds it out until a complete rotation is made by cam 32 to the point where pawl plate 38 again engages the cam lever 44 pushing pawl plate 38 aside, and permits cam lever 44 to fall back into the notch. Cam lever 44 is pivoted by actuating relay 26. When contact is made in the selecting circuit of FIGURE 1 between contact points 24E and 24D, actuating relay 26 energizes to pivot cam lever 44 to the periphery of cam 32. This causes cam lever 44 to engage contact point 26A, completing a circuit across timing motor 28 so that it will rotate through one revolution before cam lever 44 again falls into the notch in the periphery of cam 32 to open the circuit and stop motor 28.

The rotation of motor 28 rotates cams 32, 34 and 36 through three hundred and sixty degrees serving to place a code signal on the telegraph circuit in a manner which will be explained hereinafter. Although not shown, shaft 30 is connected to motor 28 through a gearing arrangement and by varying the gearing ratio the speed of which shaft 30 will rotate can be varied.

Cam 36 has in its periphery a series of notches 46 into which a pawl 48 falls to close contact 36A. On each closure of contact 36A a stepping switch mechanism indicated generally by numeral 50 is actuated to step one position. Stepping switch mechanism 50 is of a design commercially available as manufactured by the C.P. Clare & Company of Chicago, Illinois, and is similar to their model SB-42. Stepping switch mechanism 50 includes a ratchet 52 mounted to rotate a shaft 54. Affixed to shaft 54 is a homing cam 56, a re-energizing switch 58 and a master stepping switch 60. Each time pawl 48 falls into a notch 46 of cam 36, relay 62 of stepping switch mechanism 50 is energized. With relay 62 energized, arm 64 is pulled towards relay 62, stretching spring 66 and lifting pawl 68. When pawl 68 is raised out of notch 46, as cam 36 rotates, the circuit is broken to de-energize relay 62 and spring 66 pulls arm 64 back to its normal position. This lowers pawl 68 causing ratchet 52 to rotate arm 54 one position. In this disclosure re-energizing switch 58 and stepping switch 60 are shown with sixteen positions each so that shaft 54 rotates one revolution when relay 62 has pulsed sixteen times to step ratchet 52 through sixteen positions.

It will be noted that cam 36 has only seven notches 46 and therefore ratchet 52 is stepped only seven positions before cam lever 44 falls back into the notch on the periphery of cam 32 breaking contact 26A and stopping motor 28. It is necessary to rotate shaft 54 through a complete revolution. A method is provided by the circuitry of this invention whereby motor 28 will continue to rotate upon receiving one pulse from third character relay 24 until shaft 54 of stepping switch mechanism 50 has rotated through a full revolution.

In order to continue the rotation of shaft 54 it is necessary to re-energize actuating relay 26. This is accomplished by re-energizing switch 58. When the seventh position is reached on re-energizing switch 58 a circuit is made to close re-energizing relay 72. This applies a voltage across actuating relay 26 to again raise the cam lever 44 out of the slot and onto the periphery of cam 32, closing contact 26A supplying electrical energy to motor 28 and causing shaft 30 to be rotated through two revolutions upon one actuation of third character relay 24. Two revolutions of shaft 30 will step ratchet 52 through fourteen positions. These fourteen positions on stepping switch 60 send out fourteen bits of information on the telegraph circuit in a manner which will be described hereinafter.

After the fourteenth position has been reached on stepping switch 60 all the information required has been out and cam lever 44 has fallen back into the notch in the periphery of cam 32. However, shaft 54 has been rotated through only fourteen positions, and it is required that it be returned to home position to be ready to send out information the next time it is called upon. This is accomplished by use of homing cam 56. It will be noted that when cam lever 44 is in the notch position and motor 28 is stopped, continuity to ground is made with contact point 26B through cam lever 44. When arm 64 of relay 62 is in the de-energized position it makes continuity with point 62A which has continuity with ground through contact point 56A, contact arm 70, contact point 26B and cam lever 44. In these positions electrical energy is provided in a closed circuit to relay 62, causing it to actuate. Upon actuation contact is broken between arm 64 and contact 62A, permitting arm 64 to be pulled by spring 66 back to its normal position, moving ratchet 52 one position. As soon as arm 64 is back to normal position continuity will again be made between arm 64 and contact point 62A, re-energizing coil 62 and moving ratchet 52 one more position. This procedure will continue until projection point 56B of cam 56 engages contact arm 70 to break connection with contact point 56A. In this disclosure only two additional positions are required to move shaft 54 to home position. However, it can be seen that the principle of this invention can be used regardless of the number of points which may be found on ratchet 52 and that stepping switch mechanism 50 will home itself to starting position upon the completion of the cycle.

Summarizing the mechanism and circuitry of FIGURE 2, it may be seen that the multiple cam timer 29 is a means of actuating stepping switch mechanism 50. Other means of accomplishing the actuation of stepping switch mechanism 50 will suggest themselves, such as the use of a time delay relay to pulse relay 62, therefore the application of the multiple cam timer 29 is by way of example only.

Before explaining the function of the mechanism of this invention whereby data is automatically transmitted by use of a telegraph circuit to be reproduced at a remotely located teletypewriter receiver, it will be necessary to briefly explain the code method of telegraph transmission. In teletypewriter operation of telegraph circuits the code for each bit of information consists of a multiunit telegraphic code, usually five units or elements of equal length. It is commonly referred to as mark and space transmission. These units consists of either an open circuit (space) or a closed circuit (mark). For example, letter A, as transmitted by the teletypewriter system has the five units of its code as follows: closed-closed-open-open-open. As another example, letter B has a code of: closed-open-open-closed-closed. In this manner in excess of 30 different combinations of codes are available and in the teletypewriter system these combinations perform all of the functions of teletypewriter sending and receiving.

Although there are only five variable units in the standard teletypewriter code, the complete code may be said to consist of seven parts. The first part is always an open circuit and the last part is always a closed circuit. The teletypewriter code, the telegraph transmission network and the teletypewriter receiver and transmission system is described on pages one hundred to one hundred and five of "Principles of Electricity Applied to Telephone and Telegraph Work," copyright 1953 by the American Telephone and Telegraph Company. This description is made based on a multiunit code of five variable units, however the principles of the invention apply to telegraphic systems utilizing multiunit codes regardless of the number of variable units.

A common method of sending the five unit code over the telegraph line is by the use of a distributor transmitting device, indicated generally by the numeral 74 of FIGURE 2. In teletypewriter operation the distributor 74 is actuated by a motor (not shown), which is continuously running while the teletypewriter machine is in operation, and through a clutch (not shown) engages a wiper arm 76. Distributor 74 consists of a continuous inner ring 78 and a segmented outer ring 80. A wiper contact 82, affixed to wiper arm 76, electrically connects the inner ring 78 with the segments of outer ring 80 when the wiper arm 76 rotates. Wiper arm 76 is retarded from rotation by a latch means 84. A sending magnet 86 is positioned to actuate latch 84 so that when sending magnet 86 is energized, latch 84 will be pulled away from wiper arm 76 and through the clutching mechanism with the motor will be rotated through a complete revolution to again engage latch 84. A sending relay 88 is actuated by cam 34. As shaft 30 turns, notches 90 in cam 34 permits pawl 92 to fall into the notches 90 and close contact 34A. As shaft 30 rotates each time a notch 90 engages pawl 92, relay 88 will be closed, energizing sending magnet 86 to actuate latch 84 and permit wiper arm 76 to rotate, sending out a coded message which will cause one function in the receiving teletypewriter machine. As shaft 30 rotates, cam 36 closes contact 36A to step stepping switch mechanism 50. Stepping switch 60 moves to various positions which set up a coded information on distributor 74, in a manner which will be described later. Cam 34, whose notches 90 are approximately five degrees behind the notches 40 of cam 36, actuate to release distributor arm 76 to send out coded information which has been set up by stepping switch 60.

When the letters X, Y, and Z are received on the receiving teletypewriter, in our example position at a pump station near Fort Smith, Arkansas, timing motor 28 is actuated to rotate shaft 30, which in turn causes the rotation of shaft 54 of the stepping switch 60 setting up selected information and distributor 74 is actuated to send the selected information back to the central control point at Tulsa, Oklahoma. The method whereby information is coded into distributor 74 will next be described.

Figure 3:
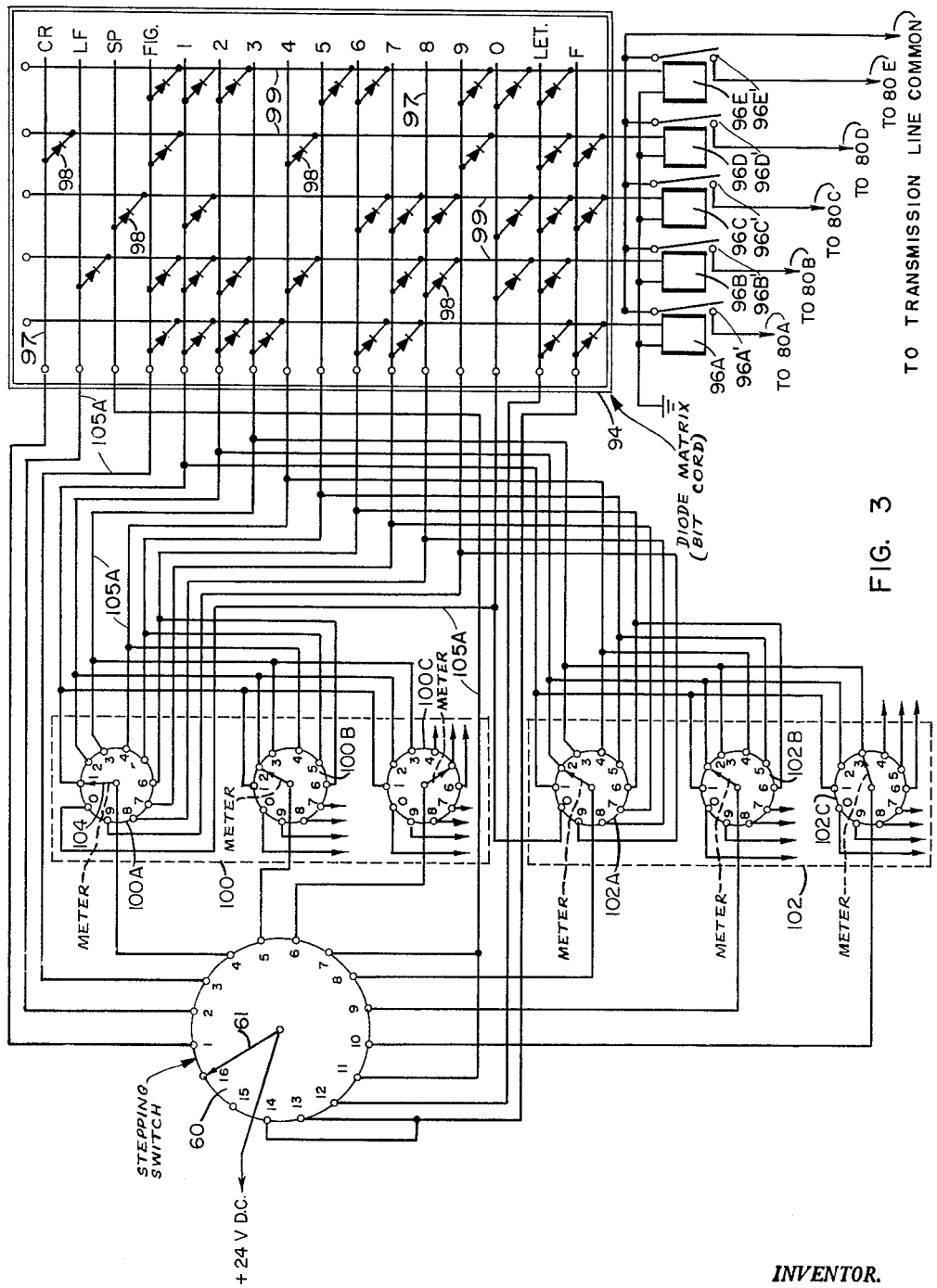
FIGURE 3 is a schematic diagram showing a means whereby each position on a stepping switch is converted to a telegraph code representing bits of information to be placed on a telegraph transmission loop.

Referring now to FIGURE 3, stepping switch 60 is shown and is the same switch shown in FIGURE 2 rotated by shaft 54. The wiper arm 61 is shown in the home or neutral position and is the position occupied before the third character relay 24 (see FIG. 1) closes to set in operation the mechanism of FIGURE 2 to begin sending back information to the central control point at Tulsa, Oklahoma. When the device is put into operation to start automatically returning information as to physical conditions existing at the pump station at Fort Smith, stepping switch 60 will be moved to position one. In this position a code must be set up conforming to the standard teletypewriter code in use in the industry today and to send back to the teletypewriter receiver positioned at the control point in Tulsa, Oklahoma, certain information. The first function which should be performed on the teletypewriter at the control point is to return the carriage of the teletypewriter to the starting point.

One of the important novel elements of this invention is the disclosure of a means whereby a single switch contact can be used to set up a five positioned teletypewriter code. This is accomplished by the use of a bit card which may also be referred to as a matrix color indicated generally by the FIGURE 94. As previously noted, there are five spaces of equal length constituting the teletypewriter code, each of the five spaces being either an open or a closed circuit. Five code relays 96A through 96E function to either open or close switches 96A' through 96B, as distributor wiper arm 76 (FIG. 2) rotates to send out one code function. Bit card 94 is made up of a multiplicity of code conductors 97, positioned horizontally on the drawing, all of which are connected ultimately to positions on stepping switch 60. Affixed to code conductors 97 are a number of unidirectional current devices or diodes 98 which function to permit current to flow in one direction only. Although any type of device which allows current flow in one direction only will be satisfactory, silicon or germanium diodes 98 are most adaptable. Five relay or circuit conductors 99 are positioned vertically on the drawing, one of each of which is affixed to distributor relays 96A through 96E. The relay conductors 99 are positioned on the bit card 94 and have diodes 98 affixed to them. Code conductors 97 are positioned on bit card 94 so as to be adjacent to but insulated from circuit conductors 99. Continuity between code conductors 97 and circuit conductors 99 is established only by diodes 98.

Diodes 98 are positioned to engage the code conductors 97 and the circuit conductors 99 of bit card 94 in a manner to form the teletypewriter code. When stepping switch 60 is in the number one position a twenty-four volt source will be placed on the top code conductor 97 of the bit card 94, indicated by the letters CR. Only one diode 98 is connected to the CR code conductor 97 and it makes continuity with relay conductor 99 fixed to relay 96D. When stepping switch 60 is in the number one position then twenty-four volts will be impressed on relay 96D, causing it to close. Although other diodes 98 are connected to the relay conductor 99 associated with relay 96D, current, to flow to any of the other relay conductors 94, would be forced to flow in an opposite direction through one of the diodes 98. Thus, with stepping switch 60 in position one, only one of the distributor relays 96, that is 96D, will be closed. A few milliseconds after stepping switch 60 reaches position one, closing relay 96D, cam 34 (see FIGURE 2) has turned to a notch 90 position closing switch 34A which in turn actuates sending magnet 86 to permit distributor wiper arm 76 to make a revolution constituting the sending of code over the telegraph network.

As distributor wiper arm 76 starts to rotate it first engages outer ring segment 80A which is connected through the contacts of relay 96A. Since relay 96A is opened, the first bit of the code is an open circuit to the telegraph transmission line. The same will apply to outer ring segment 80B and 80C. When the distributor wiper arm 76 reaches outer ring segment 80D a closed circuit will be found through relay 96D so that a closed circuit is presented to the telegraph transmission line. Outer ring segment 80F will present a closed circuit automatically as in all cases the last segment of the teletypewriter code is a closed circuit. As stated previously the first portion of the multiunit code is always an open circuit position, or the position occupied by wiper arm 76 while supported in a non-rotating condition by latch 84. Thus the code send out when stepping switch 60 is in position one is as follows: Open-open-open-open-closed-open-closed. This conforms to the teletype code for "carriage return" which means that the carriage of the receiving teletypewriter machine at the Tulsa, Oklahoma control point will return the paper on which the message is being typed to the left hand edge of the paper. The code sent out by this novel method is exactly the same as the code which would be sent by an operator sitting at the teletypewriter machine at the pump station at Fort Smith, Arkansas, depressing the key on his teletypewriter machine marked "Car. Ret."

As timer motor 28 (FIGURE 2) continues to rotate, cam 36 again closes switch 36A causing relay 62 to advance ratchet 52 and stepping switch 60 to the second position. In the second position voltage is placed on code conductor 97 marked "LF." With voltage on code conductor 97 marked "LF" only relay 96B will be closed, as only the relay conductor 99 associated with relay 96B has a diode 98 connecting it with the code conductor 97. Again cam 34 causes distributor arm 76 to rotate and this time the code sent out will be as follows: Open-Open-closed-open-open-open-closed, which conforms to the teletypewriter machine code of "line feed" meaning the receiving teletypewriter machine as Tulsa, Oklahoma will feed the paper up one line to a new line. Thus the first and second position of stepping switch 60 places the teletypewriter receiving machine at the central control point in Tulsa, Oklahoma, ready to receive the information as to the physical conditions existing at the pumping station at Fort Smith, Arkansas. When stepping switch 60 reaches position 3 the teletypewriter code will be sent out: Open - closed - closed - open - closed - closed - closed, which conforms to teletype code indicating the upper carriage position or figures and when this code is received at the main control point of Tulsa, Oklahoma, the teletypewriter machine will move itself to the upper carriage position placing it in condition to receive figures.

Although physical data of a variety of natures may be necessary for each pumping station, for purposes of this disclosure only two variable bits of information or valves will be relayed back to the control point. Numeral 100 indicates value indicating switches or a digital counting mechanism enclosed in dotted lines. Such a counter 100 would be, for example, of a type manufactured by the Veeder-Root Manufacturing Company of Hartford, Connecticut. In this example it will be assumed that counter 100 is affixed to a meter which reads values such as the volume of fluid which has passed through the meter in barrels. The reading of counter 100 is then in units, tens, and hundreds of barrels. Counter 100 now indicates that a value of 125 barrels have passed through the meter. This information is the type required at the central control point at Tulsa, Oklahoma. A separate value indicating switch or counter is indicated generally by numeral 102, enclosed in dotted lines. As an example, it will be assumed that counter 102 is affixed to a meter (not shown) showing a meter reading of fluid which has passed out of the tank. The desired function then is to put into teletypewriter code the information indicated on counters 100 and 102 so that it will be disseminated on the telegraph network and automatically recorded on the teletypewriter machine at the central control point at Tulsa, Oklahoma.

When stepping switch 60 reaches position four, the twenty four volts applied to switch wiper arm 61 will be applied to the wiper arm 104 of dial 100A. Dial 100A is the hundredths figure of the outflow meter and is pointing to position one. Position one connects twenty four volts to the figure "1" code conductor 97 of bit card 94 by conducting means 105A. With stepping switch 60 in position four, relays 96A, 96B, 96C and 96E will be closed so that distributor wiper arm 76 will send out a code of: open-closed-closed-closed-open-closed-closed and the numeral "1" will be printed by the teletypewriter receiving machine at the central control point at Tulsa, Oklahoma. As stepping switch 60 moves to position five twenty four volts is applied to dial 100B. Dial 100B is connected or is pointing to numeral two, and is the tens dial, and applies twenty four volts to the numeral "2" code conductor 97 of bit card 94 which closes relays 94A, 94B and 94E, sending out a code which will produce figure "2" at the teletypewriter receiving machine at Tulsa, Oklahoma.

All of the figure "1" positions of the dials of both counters 100 and 102 are tied into the code conductor 97 indicating numeral "1" of bit card 94. Since the wiring is merely repetitious, all of the conductors have not been shown connected for dial 100B and 100C and the same is true of dials 102B ond 102C. When stepping switch 60 reaches position 6 the twenty-four volts would be applied to the code conductor 97 of the bit card 94 indicated by numeral "5," closing proper relays to send out the code to reproduce the figure "5." Thus, the positions four, five, and six of stepping switch 60 reproduced the numbers "125" on the teletypewriter at Tulsa, Oklahoma, indicating that one hundred and twenty five barrels of fluid has passed through the meter associated with counter 100 at the Fort Smith pump station at the instant the record is returned.

Position seven of switch 60 is connected to the code conductor 97 of bit card 94 for "space" and means that at this position the code will be sent out to cause the teletypewriter in Tulsa to make a space. This is necessary to separate the first meter reading from the second meter reading. In like manner positions eight, nine, and ten of stepping switch 60 will reproduce readings at Tulsa shown on dials 102A, 102B and 102C. Position eleven of stepping switch 60 sends out a code for a space. Position twelve of stepping switch 60 sends out a code indicating that the following is to the letters which will shift the teletypewriter receiver at Tulsa into the lower case. Positions thirteen and fourteen send out an identifying letter to identify the station from which the meter readings are reported. In this case positions thirteen and fourteen will each send out the letter F, indicating Fort Smith.

Stepping switch 60 will then move quickly to home position by means which has been previously determined. Thus, by the system of this invention an operator located at a control point in Tulsa, Oklahoma, by quickly typing the letters X, Y, and Z instigates the teletypewriter at the pump station located at Fort Smith, Arkansas to automatically send back necessary information as to the physical conditions at the pump station. The automatic sequence serves to return the carriage to starting positions, turn the paper to a new line, set the carriage for figures and type 125–223–FF. Thus the operator at the control point at Tulsa, Oklahoma at any moment can automatically receive information as to the quantity of fluid having moved out of the pump station at Fort Smith, Arkansas. The whole procedure is carried out without disturbing or in any way altering the use of the standard teletypewriter machines and telegraph transmission circuits.

The principles of this invention have been described as they pertain to a very particular application. For instance, counters 100 and 102 are shown with only three digits each, whereas usually there will have five or six digits. Only two counters are shown, 100 and 102, whereas in most installations five or six or any number of different types of information would normally be required. For instance, in most pump stations it is required to know pressures, temperatures, volumes, on and off positions of valves, engines, and motors, and a great amount of other data, all of which may be returned to the central control point automatically by the use of the principles of this invention. Stepping switch 60 has been shown with only 16 positions whereas in actual use it oridinarily will have a great number of positions sufficient to include a large quantity of information to be returned.

This disclosure has been described as it is limited to a use for automatically sending information from one point, Fort Smith, Arkansas, back to a central control point at Tulsa, Oklahoma. In practice, the central control point at Tulsa, Oklahoma could, by the principles of this invention, automatically receive information from a large number of pump stations. Each pump station will have a different code arrangement for sensitizing the automatic return mechanism of this invention in the manner that in this disclosure the pump station at Fort Smith is sensitized by sending the letters X, Y and Z in rapid sequence.

Another pump station may be sensitized by sending out the letters X, Z, Y, or X, Y, X, yet another station may be sensitized by the letters A, B, C. It is therefore possible for a central control point to be able to automatically receive all necessary information from a large number of pump stations along a pipe line system.

Bit card 94 has been shown as it is used in conjunction with switches and counters to set up a teletypewriter code. It is apparent that the principle of this invention involves a method whereby closing one contact point (stepping switch 60) can set up a teletypewriter code. The use for this invention is consequently not limited to the application as shown in this disclosure for transcribing digital counter or meter reading into teletypewriter code. The principles of the invention may be used for any circumstance where it is necessary to put letters, figures, or other teletypewriter stunts and functions into multiunit telegraph code.

This disclosure describes the system of this invention using distributor relays 96A through 96E. Transistors, or other circuit control devices, such as vacuum tubes, may be used in place of distributor relays 96A through 96E. With circuit control devices, such as transistors, the code, instead of being a sequence of open and closed circuits would be a sequence of relatively high and relatively low resistance circuits.

By the use of distributor relays 96A through 96E the telegraph transmission network is isolated from the circuitry of the balance of the mechanisms and devices of this invention. If isolation is not required the bit card 94 can be used to place teletypewriter code on the distributor 74 without the use of distributor relays 96A through 96E or other circuit control devices. This is accomplished by connecting circuit conductors 99 directly to the segments 80 of distributor 74. The common side of the telegraph transmission network (see FIGURE 2) is then connected to wiper arm 61 of stepping switch 60. As an example, with stepping switch 60 in position five, as distributor 74 rotates to segment 80A, the first code position would constitute a closed circuit in that current can flow from the telegraph transmission line common, through wiper arm 61 to position five of stepping switch 60, to position two of counter 100B, and to code conductor 97 "2" of bit card 94. Code conductor 97 "2" provides continuity to segments 80A, 80B and 80E of distributor 74 since diodes 98 connect code conductor 97 "2" to circuit conductors 99 connected to these distributor segments 80. Distributor segments 80C and 80D will present an open circuit to the telegraph transmission network since the circuit conductors 99 connected to these distributor segments 80 have no diodes 98 permitting current to flow from code conductor 97 "2." Of course unidirectional current devices or diodes 98 may be reversed so that current flows from the circuit conductors 99 to the code conductors 97 without changing the principles of the invention. Thus, the system of the bit card 94 can be used to encode into a teletypewriter distributor 74 a multiunit telegraphic code by closing a circuit in only one position. (That is, moving stepping switch 60 one position sets up a different multiunit code.)

This invention has been described in certain instances as it applies to a teletypewriter as a receiving instrument and at other times as a transmitting instrument. Ordinarily, teletypewriters as used in industry are both transmitter and receiver instruments combined. Also, the invention has been described as it applies to encoding a teletypewriter distributor 74. The encoding method of bit card 94 is applicable to deciminating a teletypewriter code onto a telegraph network utilizing other teletypewriter means equivalent to the distributor 74 device.

It is manifest that many other changes may be made in the details of construction and the arrangement of components of this invention without departing from the spirit and the scope of this disclosure.

I claim:

A telemetering reporting station comprising a terminal adapted to be connected to a transmission line, a cyclic distributor, said distributor having a plurality of segments and a wiper, said wiper being connected to said terminal, means connected to said terminal for sensing an electrical pulse code, means for generating a pulse train, said sensing means actuating said generating means, a stepping switch, means actuating said stepping switch through a complete cycle in response to said pulse train, a plurality of multi-positioned value indicating switches, the position of the movable contact of each switch being correlated to a predetermined value, a source of voltage, means connecting said stepping switch to said plurality of switches for applying said voltage to each movable contact in sequence, a diode matrix having a plurality of input conductors and a plurality of output conductors, means coupling said plurality of switches in parallel and to said plurality of input conductors, a plurality of relays, one of each said relays being connected to one of said output conductors, each of said relays grounding a respective segment of said distributor when energized by said voltage, means for cycling said distributor wiper once for each actuation of said stepping switch, whereby a telegraphic code is transmitted for each value indicating switch in sequence in response to reception of said electrical pulse code.

References Cited by the Examiner
UNITED STATES PATENTS

| | | | |
|---|---|---|---|
| 1,194,524 | 8/16 | McFell | 340—157 |
| 1,647,284 | 11/27 | Field | 340—157 |
| 1,897,657 | 2/33 | Yates | 340—204 |
| 2,207,743 | 7/40 | Larson | 340—204 |
| 2,406,384 | 8/46 | Kinkead | 340—204 |
| 2,424,571 | 7/47 | Lang | 178—4.1 |
| 2,665,336 | 1/54 | Saykay | 178—79 |
| 2,826,252 | 3/58 | Dickstein | 340—204 |

NEIL C. READ, *Primary Examiner*.

THOMAS B. HABECKER, L. MILLER ANDRUS, E. JAMES SAX, *Examiners*.